US009927535B2

(12) United States Patent
Rodell

(10) Patent No.: US 9,927,535 B2
(45) Date of Patent: Mar. 27, 2018

(54) RADON DETECTION AND MITIGATION IN A BUILDING AUTOMATION SYSTEM

(71) Applicant: Kristine C. Rodell, Island Lake, IL (US)

(72) Inventor: Kristine C. Rodell, Island Lake, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1187 days.

(21) Appl. No.: 13/907,235

(22) Filed: May 31, 2013

(65) Prior Publication Data

US 2013/0331021 A1    Dec. 12, 2013

Related U.S. Application Data

(60) Provisional application No. 61/656,089, filed on Jun. 6, 2012.

(51) Int. Cl.
   *F24F 11/00* (2006.01)
   *G01T 1/178* (2006.01)
   *G01T 7/00* (2006.01)

(52) U.S. Cl.
   CPC .......... *G01T 1/178* (2013.01); *F24F 11/0001* (2013.01); *G01T 7/00* (2013.01)

(58) Field of Classification Search
   CPC .......... F24F 11/0001; F24F 7/08; F24F 7/013; G01T 1/178; G01T 7/00
   USPC ........ 454/239, 256, 370, 909; 250/394, 600, 250/336.1, 395
   See application file for complete search history.

(56) References Cited

U.S. PATENT DOCUMENTS

| 4,352,349 A | * | 10/1982 | Yoho | F24C 15/2021 |
| | | | | 126/299 R |
| 5,292,280 A | * | 3/1994 | Janu | F24F 7/08 |
| | | | | 454/229 |
| 5,831,526 A | | 11/1998 | Hansler | |
| 5,898,374 A | * | 4/1999 | Schepka | G01F 23/243 |
| | | | | 250/255 |

(Continued)

OTHER PUBLICATIONS

Radon, "A Citizen's Guide to Radon," United States Environmental Protection Agency, Webpage, http://www.epa.gov/radon/pubs/citguide.html, pp. 1-9, May 22, 2013.

(Continued)

*Primary Examiner* — Gregory Huson
*Assistant Examiner* — Dana Tighe

(57) ABSTRACT

Radon detection or sensing is provided within a building automation system for a site (e.g., building or campus). As such, one or more short-term and/or long-term radon levels may be detected or monitored. The radon levels are monitored from a remote location. The building automation system may be programmed to automatically respond to a specific (e.g., unsafe) radon level and/or a change in one or more radon levels, or combinations thereof, in order to mitigate or reduce the monitored or detected radon levels. Trending, pattern comparison between radon level and other measured information, automated response, interaction or response between different radon sensors, or combinations thereof may be provided by integrating one or more radon sensors into a building automation system.

11 Claims, 3 Drawing Sheets

(56) References Cited

U.S. PATENT DOCUMENTS

| | | | | |
|---|---|---|---|---|
| 5,971,067 | A * | 10/1999 | Rayburn | F24F 11/0017 165/217 |
| 6,327,915 | B1 * | 12/2001 | Van Cleve | G01F 1/8409 73/861.357 |
| 7,034,934 | B2 * | 4/2006 | Manning | H05B 37/02 315/149 |
| 7,574,320 | B2 * | 8/2009 | Corwin | G08C 17/00 702/127 |
| 2002/0019712 | A1 * | 2/2002 | Petite | G01D 4/004 702/61 |
| 2004/0028190 | A1 * | 2/2004 | Golden | G08B 25/08 379/37 |
| 2004/0232345 | A1 | 11/2004 | Jagam et al. | |
| 2006/0234621 | A1 * | 10/2006 | Desrochers | F24F 3/044 454/239 |
| 2007/0131859 | A1 * | 6/2007 | Kleefstra | G01T 1/178 250/253 |
| 2009/0158188 | A1 * | 6/2009 | Bray | F24F 11/001 715/771 |
| 2010/0105311 | A1 * | 4/2010 | Meneely, Jr. | F24F 11/0017 454/239 |
| 2010/0276603 | A1 | 11/2010 | Niort et al. | |
| 2010/0298981 | A1 * | 11/2010 | Chamorro | H01R 13/6456 700/276 |
| 2011/0057801 | A1 | 3/2011 | Logan | |

OTHER PUBLICATIONS

Moranriu, G., et al.; "A Novel Procedure and Apparatus for Measuring the Radon Concentration in Air," Optimization of Electrical and Electronic Equipment, 2008. Optim 2008. 11th International Conference; IEEE, Piscataway, NJ, pp. 221-224, XP031341325, ISBN: 978-1-4244-1544-1. (4 pages).

Bertoldo, N. A. et al., "Development of a Real-Time Radiological Area Monitoring Network for Emergency Response at Lawrence Livermore National Laboratory," IEEE Sensors Journal, IEEE Service Center, New York, NY, US; vol. 5, No. 4, pp. 565-573, XP011136146. (9 pages).

Choi, G. Heung et al., "Design of Service System Framework for Web-Based Monitoring and Control of Indoor Air Quality (IAQ) in Subway Stations," New Trends in Information and Science 2009. NISS '09. IEEE Conference, Piscataway, NJ, US; pp. 659-663; XP031531317; ISBN: 978-0-7695-3687-3. (5 pages).

PCT Search Report dated Nov. 14, 2013, for PCT Application No. PCT/US2013/044209. (12 pages).

* cited by examiner

RADON DETECTION AND MITIGATION IN A BUILDING AUTOMATION SYSTEM

RELATED APPLICATION

The present patent document claims the benefit of the filing dates under 35 U.S.C. § 119(e) of Provisional U.S. Patent Application Ser. No. 61/656,089, filed Jun. 6, 2012, which is hereby incorporated by reference.

BACKGROUND

According to the Environmental Protection Agency ("EPA"), radon causes approximately 20,000 cancer deaths annually, making radon the second leading cause of lung cancer and the first leading cause of lung cancer among non-smokers. Radon may be found in any building, and radon levels may vary from day to day. The EPA recommends that action be taken when radon levels in buildings exceed 4 picocuries radon per liter of air (4 pCi/L).

Conventional radon sensors or detectors are configured for use in residential markets (e.g., homes) and typically operate as standalone sensors or detectors with audio alarms, even when used in a non-residential market. Conventional radon sensors enable a user to detect or monitor radon levels on-site with the audio alarm broadcast from the radon sensors where the radon sensors are located. Some of the more sophisticated conventional radon detectors may print out a report and download the data to a computer.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

Unlike conventional radon sensors or detectors, the present embodiments provide for radon detection or sensing within a building automation system for a site (e.g., building or campus). As such, one or more short-term and/or long-term radon levels may be detected or monitored. The radon levels are monitored from a remote location. The building automation system may be programmed to automatically respond to a specific (e.g., unsafe) radon level and/or a change in one or more radon levels, or combinations thereof, in order to mitigate or reduce the monitored or detected radon levels. Trending, pattern comparison between radon level and other measured information, automated response, interaction or response between different radon sensors, or combinations thereof may be provided by integrating one or more radon sensors into a building automation system.

Figure 1:
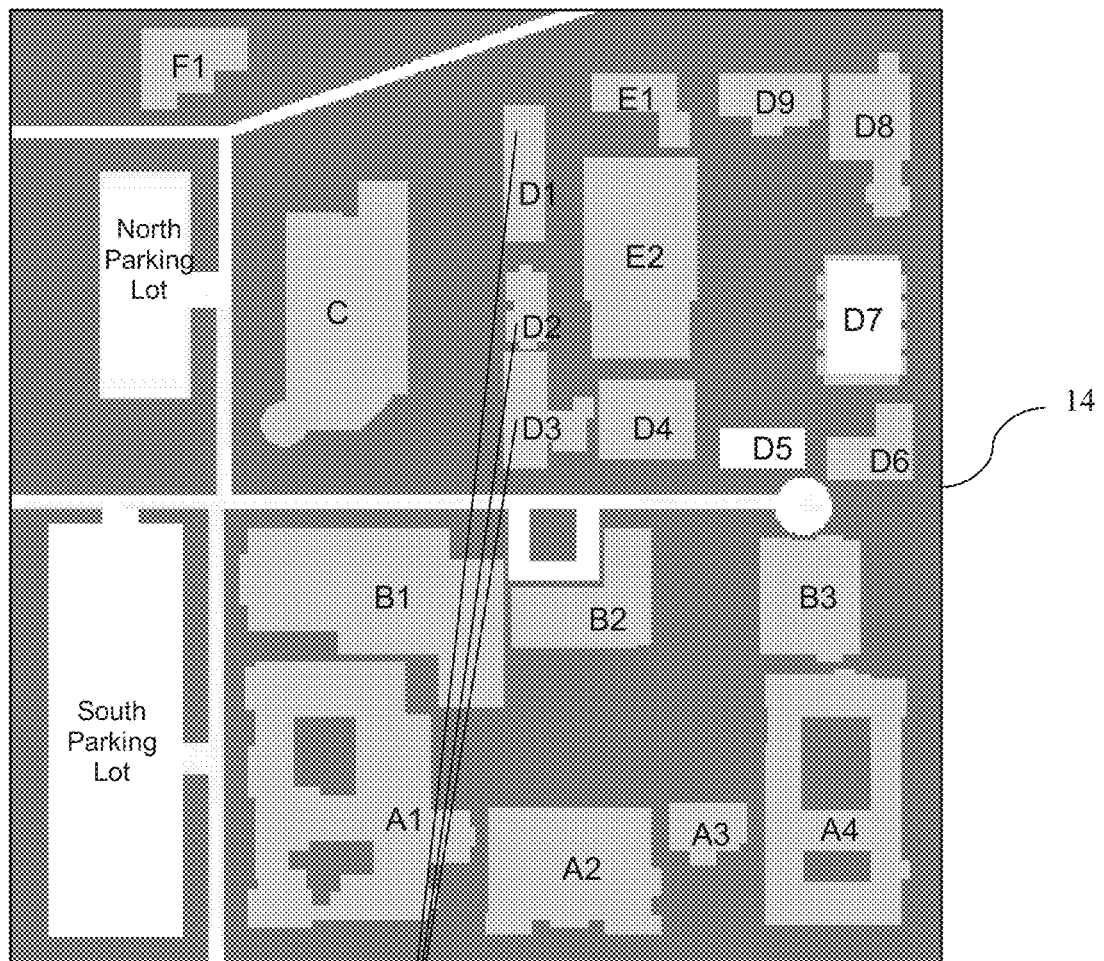
FIG. 1 illustrates an exemplary building automation system for radon detection and mitigation, where the system has a site-wide user interface for centrally monitoring and reacting to radon levels within a site that is a building or a campus of buildings.
Figure 1:
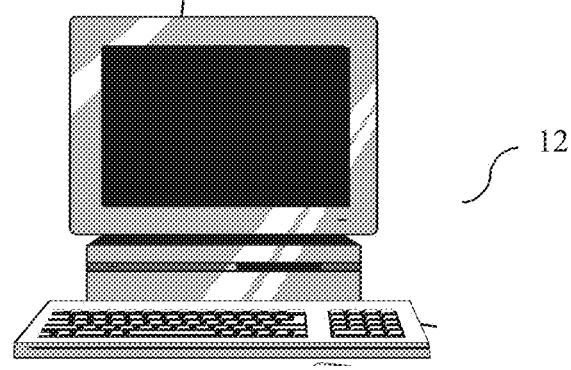

FIG. 1 shows an example building automation system 12. The system 12 operates to automate control of a site 14. The site 14 may be one building or may include a plurality of buildings (e.g., a campus). The campus includes a plurality of different buildings that are separate and/or interconnected. The buildings are in a same general geographic location (e.g., block or facility). In other embodiments, the buildings are separated by greater distances or other facilities, such as being in different cities, states, or countries. The site 14 may also include a plurality of local areas or portions of one or more buildings, such as one or more rooms, wings, floors, or combinations thereof. In an alternative embodiment, the building automation system 12 operates with a single building, such as a multi-story building or a manufacturing facility.

Figure 2:
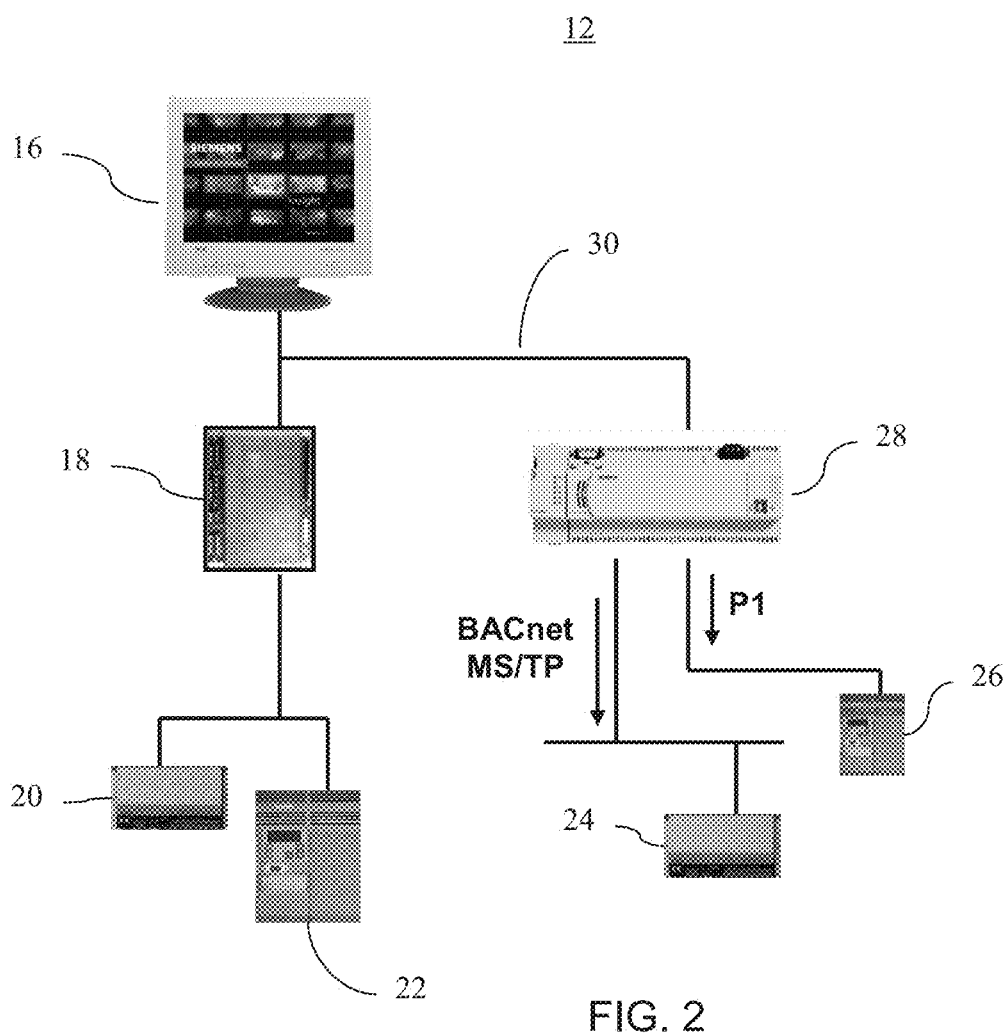
FIG. 2 illustrates an exemplary architecture for a building automation system with one or more radon sensors.

FIG. 2 shows an example of the building automation system 12. Building automation systems 12 typically integrate heating, ventilation and air conditioning (HVAC) systems, security systems, fire systems, and/or other systems. The present embodiments are directed to a building automation system 12 that integrates a radon detection or sensing system with one or more of these systems.

The building automation system 12 generally includes a controller 16 and one or more automation components (18, 20, 22, 26, and 28) coupled with or connected to the controller 16 via one or more wired or wireless communication networks 30. The one or more automation components (e.g., radon sensor or sensors 24) use the communications network 30 to communicate. The one or more networks 30 may be the same or may be different. The one or more networks 30 may include a wired network, a wireless network, or a combination of a wired and wireless network, such as a cellular telephone network and/or 802.11x compliant network. The network 30 is private network, may include a publicly accessible network, such as the Internet, or combination thereof. The type and configuration of the communications network 30 is implementation dependent, and any type of communications network which facilitates the described communications between the controller 16 and the automation components, available now or later developed, may be used.

The controller 16 includes an application specific integrated circuit, general processor, digital signal processor, control processor, field programmable gate array, analog circuit, digital circuit, programmable power process language application, combinations thereof, or other now known or later developed device for monitoring, controlling and/or routing. The controller 16 implements control processes for the site 14. The controller controls, operates, communicates with, and/or is responsive to the one or more automation components, such as sensors (e.g., radon sensors), actuators, or other terminal equipment, positioned or located at, in, or throughout the site or portions or areas thereof.

The controller 16 is shown in FIG. 2 as a workstation, front end, or central control computer. The controller 16 processes information from, responds to, or otherwise controls based on the radon sensor 24. In other embodiments, the controller 16 may be a field panel 18, a processor, a management processor, a computer, a sensor 20 controlling an actuator 22, an actuator 22 controlling a sensor 20, terminal equipment 26 controlling itself, and/or other devices of a building automation network with a control process for itself or other components.

The one or more automation components may include one or more terminal controllers 26, sensors 20, actuators 22, controllers 16, other devices (e.g., personal computers, panels 18, or monitors), or combinations thereof. The one or more sensors 20 may include one or more radon sensors 24, temperature sensors, humidity sensors, fire sensors, smoke sensors, occupancy sensors, air quality sensors, gas sensors, $CO_2$ or CO sensors or other now known or later developed sensors, such as an oxygen sensor for use in hospitals. Micro-electro-mechanical sensors or larger sensors for sensing any environmental condition may be used. The one or more actuators 22 control building wide components, such as a chiller, boiler, building intake vent, or building air flow out take vent, or local components, such as a damper, heating element, cooling element, sprinkler, or alarm. The one or more actuators 22 may include one or more valves, relays, solenoids, speakers, bells, switches, motors, motor starters, dampers, pneumatic devices, combinations thereof, or other now known or later developed actuating devices for building automation. The one or more automation components may include memories and processors. The radon sensors 24 can be either individual devices meant solely for radon detection or can be incorporated into other equipment controllers or devices.

The building automation system may further include a front-end client in communication with or operable on the controller 16. The front-end client may be any sort of user or operator interface, such as, for example, Insight, Field Panel Web Server, Siemens Launch Pad, or Desigo™ CC, each commercially available from Siemens Industry, Inc., or a mobile application. The front-end client may output, display, or provide readings or data from the one or more building automation components (e.g., the one or more radon sensors).

Figure 3:
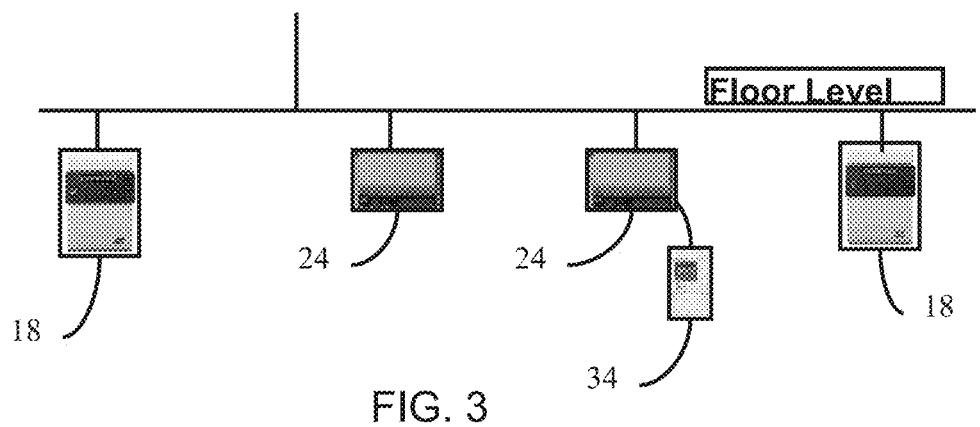
FIG. 3 illustrates an exemplary floor level building automation system with a radon sensor deployed as one of a group of automated components.

FIG. 2 shows a portion or the entire building automation system 12. In some embodiments, at least part of the building automation system 12 is separated into different networks or branches. FIG. 3 shows one network or branch as a floor level network (FLN) with a panel 18 or panels 18 controlling various components and receiving signals from sensors, such as radon sensors 24. In this embodiment, the one or more radon sensors 24 are integrated into the building automation system (BAS) at the FLN level. One of the radon sensors 24 is adjacent to or integrated into a same housing as a thermostat 34.

The building automation systems 12 shown in FIGS. 1-3 are generally operable to monitor, detect, or test one or more radon levels at or throughout the site by reading and/or processing one or more radon levels obtained, detected, or measured by one or more radon sensors 24, respectively, positioned or located at, in, or throughout the site 14 or portions thereof. The building automation system 12 may monitor, detect, or test one or more current radon levels, one or more radon levels over the short-term (e.g., 24 hours, 48 hours, etc.), one or more radon levels over the long-term (e.g., over the course of 6 months, 1 year, etc.), or combinations thereof.

The building automation system 12 may, in some embodiments, output, provide, or display the one or more short-term and/or long-term radon levels to the front-end client for presentation to a user or operator (e.g., the site operator). The building automation system 12 thus allows the user or operator to monitor the one or more radon levels at, in, or throughout the site. When, for example, the front-end client is a mobile application, the user or operator may monitor the radon levels from a remote location. The building automation system 12 may also allow the user or operator to generate or view trend reports or logs that depict the one or more radon levels over the long-term, as measured or detected by the building automation system 12.

In some embodiments, the user may program the building automation system 12 to notify or alert the user or operator, via or using the front-end client, when one or more radon levels above a pre-determined threshold (e.g., over 4 pCi/L) have been detected or measured. Alternatively, or additionally, the user may program the building automation system 12 to notify the user, via or using the front-end client, when, for example, one or more radon levels are trending upwards and/or are close to the pre-determined threshold, one or more radon levels have been above the pre-determined threshold (e.g., over 4 pCi/L) for a specified amount of time (e.g., 30 days), one or more radon levels at or in one or more portions or areas of the site, respectively, are higher or lower than one or more radon levels at or in one or more other portions or areas, respectively, of the site, or combinations thereof. The alert or notification may be in the form of, for example, a message (e.g., SMS) or an alarm.

In turn, the user or operator may alter or adjust the one or more automation components based on the short-term and/or long-term radon levels. The user may, for example, adjust the dampers and/or increase the exhaustion ventilation level in or at the site 14 or portions thereof. By adjusting these components, radon may be dispersed, thus lowering radon levels at or throughout the site. In other embodiments, different or additional automated components may be adjusted. The user may program the system to perform automated responses in reaction to a radon level. A set response may be used, or the user may program any one or more of various reactions. Other adjustments may also be made to the building automation system 12 and/or the site 14.

Alternatively, or additionally, the building automation system 12 may automatically alter or adjust the one or more building automation components based on the short-term and/or long-term radon levels. The controller 16 provides an automated response. The automated response may happen when one or more short-term radon levels above a pre-determined threshold (e.g., over 4 pCi/L) have been detected or measured at or in the site 14 or portions thereof, one or more radon levels are trending upwards and/or close to the pre-determined threshold, one or more radon levels have been above the pre-determined threshold (e.g., over 4 pCi/L) for a specified amount of time (e.g., 30 days), one or more radon levels at or in one or more portions or areas of the site, respectively, are higher or lower than one or more radon levels at or in one or more other portions or areas, respectively, of the site 14, or combinations thereof. In turn, the controller 16 may automatically adjust or alter the dampers and/or increase the exhaustion ventilation level in or at the site 14 or portions thereof in an effort to disperse the radon and reduce or mitigate the one or more radon levels. In other embodiments, different or additional automated components may be adjusted. A pressure differential may be created between rooms to help maintain the radon in one location and prevent spreading. Other adjustments may also be made to the building automation system 12 and/or the site 14.

In one embodiment, comparative trending may occur in relation to other building automation system patterns. Because the radon sensors 24 are part of a building automation system 12, the radon data can be comparatively trended in relation to other building automation patterns. Trending radon levels in comparison to other patterns such as outdoor air temperature, humidity, or air pressure, may help the building manager to predict and ultimately prevent unhealthy situations.

In one embodiment, the one or more radon sensors 24 may be operable to display a digital value that indicates a radon level or a warning lamp to show a level above or below a threshold. A simpler, digital radon sensor can be designed for use within the building automation system. This digital sensor will indicate a binary digital value to indicate that the radon level is above or below the safe radon level. Rather than using bandwidth to communicate the sensed radon level with greater resolution, the binary information may be used. The controller 16 may program the sensor 24 with the threshold to use for comparison, and the sensor 24 then compares the measured amount of radon to the programmed threshold. The mitigation response can be programmed to react to this reading.

In one embodiment, the one or more radon sensors 24 may be operable to flash an LED to indicate the alarm level has been reached. Even though the radon sensors 24 will be part of a building automation system 12 and the values visible from the front end, the sensors can also flash an LED to indicate the alarm level is reached. This LED can be viewed by the building occupants in the immediate area.

In one embodiment, the one or more radon sensors 24 may emit an audible alarm for people in the immediate area to indicate that the alarm level has been reached. Even though the radon sensors will be part of a building automation system 12 and the values visible from the front end, the sensors 24 can also emit an audible alarm for people in the immediate area.

In one embodiment, the one or more radon sensors 24 may be mountable, mobile, or combinations thereof. The radon sensors 24 in the building automation system 12 can be mounted in a set location or can be mobile, allowing the building manager to place the sensors 24 in remote areas of the buildings. This makes it possible for a building manager to determine areas that need monitoring the most.

In one embodiment, the one or more radon sensors 24 (e.g., a plurality of radon sensors) may be networked together in a series. Radon sensors 24 can be set up in a networked series. The series configuration allows the same response from multiple sensors 24. For example, if one sensor 24 triggers an alarm for being over the threshold and elicits a mitigation response, the others sensors 24 in the series also respond with the same or different action or series of actions. The controller 16 may cause the same or different actions for rooms, locations, or buildings associated with various sensors 24 due to a different sensor 24 detecting a threshold amount of radon or other trigger event.

In one embodiment, the one or more radon sensors 24 (e.g., a plurality of radon sensors) may be networked together in a series and may be connected to a network reporting station via a wired or wireless connection. The network of sensors 24 connect either wired or wirelessly to a network reporting station.

In one embodiment, the building automation system 12 includes the master controller 16 operative to monitor or control one or more buildings, one or more campuses each comprising a plurality of buildings, or combinations thereof. The one or more buildings, the one or more campuses, or combinations thereof, may be remote or local. The controller 16 used as the master can monitor or control numerous building or campuses whether they are local or remote. Multiple sites 14 with potentially multiple sensors 24 can be monitored and controlled at one central location. For example, a customer with geographically scattered campuses throughout a state can monitor all radon sensors 24 regardless of their individual locations at one central location.

In one embodiment, the one or more radon sensors 24 (e.g., a plurality of radon sensors) are analog and are networked together such that radon values from the radon sensors 24 may be aggregated to identify patterns. Radon sensors 24 are analog and networked, allowing values to be aggregated to find patterns. These patterns can be trended and compared. Examples of patterns include such statements as the following: (i) Building D9 is always higher than the other buildings on a campus; and/or (ii) all campuses in the southern portion of the state have elevated radon levels. These comparative trends may be used to adjust building automation, such as increasing air flow for Building D9 or southern campuses relative to other buildings or campuses.

Figure 4:
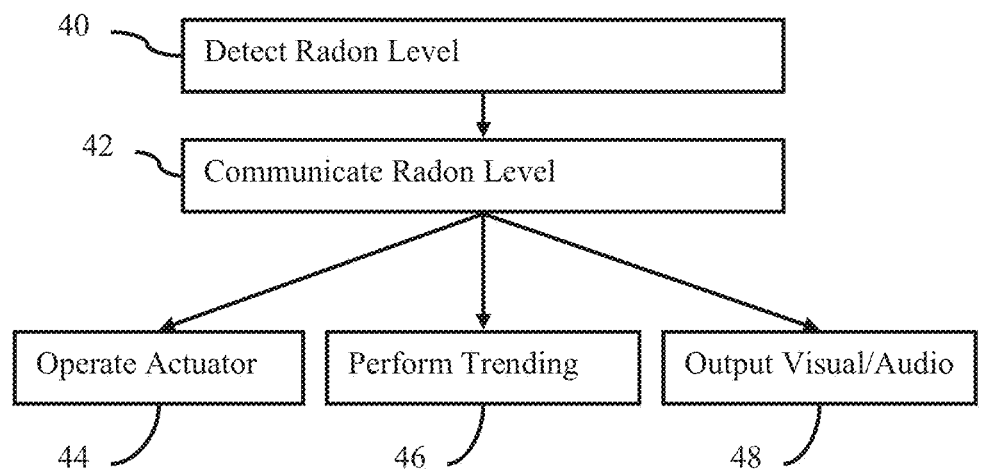
FIG. 4 is a flow chart diagram of one embodiment of a method for building automation with a radon sensor.

FIG. 4 shows a method for automated building control in response to radon detection. The method is implemented by the building automation system 12 and/or radon sensors 24 of FIG. 1, 2, or 3. Additional, different, or fewer acts may be provided. For example, act 40 and one or more of acts 44, 46, or 48 are performed without act 42. The acts are performed in the order shown or different orders. For example, acts 44, 46, and 48 are performed in any order.

As discussed above, the radon sensor 40 detects the radon level. In act 42, the radon level is communicated to the controller. The level is communicated as a reading of the amount of radon (e.g., 4.5) or a binary indication of the radon level exceeding or not a threshold. In act 44, the automation system automatically responds to the radon level by operating one or more actuators. With a series arrangement, other actuators or sensors are operated in response to an alarm level for one radon sensor. In act 46, trending analysis is performed. The trend of the radon level over time is determined. The trend of radon as compared to other types of measures or other radon levels for different buildings or locations is output. In act 48, the radon sensor outputs visual and/or audio warnings.

It should be understood that various changes and modifications to the presently preferred embodiments described herein will be apparent to those skilled in the art. Such changes and modifications can be made without departing from the spirit and scope of the present invention and without diminishing its intended advantages.

I claim:

1. A building automation system for radon detection and mitigation, the system comprising:
 a controller;
 a plurality of automated components in communication with the controller, the plurality of automated components comprising at least one radon sensor, at least one other sensor of a different type than the radon sensor, and at least one damper or building air flow out-take vent;
 wherein the controller is configured to monitor the at least one radon sensor and adjust the damper or building air flow out-take vent based on an upward trend of radon level from the monitoring and wherein the controller is configured to output comparative trending of the radon level to a level of another measured characteristic from the at least one other sensor.

2. The system of claim 1, wherein the at least one radon sensor is operable to display an indication of a radon level.

3. The system of claim 2, wherein the at least one radon sensor is operable to flash a light emitting diode in response to an alarm level of radon.

4. The system of claim 1, wherein the at least one radon sensor is operable to emit an audible alarm in response to an alarm level of radon.

5. The system of claim 1, wherein the at least one radon sensor is mountable, mobile, or a combination thereof.

6. The system of claim 1, wherein the plurality of automated components comprises a plurality of radon sensors, each radon sensor of the plurality of radon sensors being networked together in a series.

7. The system of claim 6, wherein one or more radon sensors of the plurality of radon sensors networked together in a series are connected to a network reporting station via a wired or wireless connection.

8. The system of claim 7, wherein the controller is configured to monitor or control one or more buildings, one or more campuses each comprising a plurality of buildings, or combinations thereof, the one or more buildings, the one or more campuses, or combinations thereof being remote or local.

9. The system of claim 6, wherein the radon sensors of the plurality of radon sensors are analog and are networked together such that radon values from the radon sensors are aggregated, and wherein the controller is configured to identify patterns between the radon sensors.

10. The system of claim 1 wherein the controller is configured to adjust the damper or building air flow out take vent to create a differential pressure between rooms, the differential pressure maintaining radon in a location.

11. The system of claim 1 wherein the controller is configured to adjust the damper or building air flow out-take vent based on a user-set threshold level of radon over a user-set threshold level of time.

* * * * *